United States Patent
Baker, Jr.

(10) Patent No.: US 8,887,626 B2
(45) Date of Patent: Nov. 18, 2014

(54) BLOWER INTENSIFIED GAS FLAME KETTLE

(75) Inventor: William P. Baker, Jr., Benicia, CA (US)

(73) Assignee: Gold Rush Kettle Korn LLC, Benicia, CA (US)

( * ) Notice: Subject to any disclaimer, the term of this patent is extended or adjusted under 35 U.S.C. 154(b) by 1008 days.

(21) Appl. No.: 12/755,648

(22) Filed: Apr. 7, 2010

(65) Prior Publication Data
US 2011/0247503 A1 Oct. 13, 2011

(51) Int. Cl.
 *A23L 1/18* (2006.01)
 *F24C 1/00* (2006.01)
 *C10C 3/12* (2006.01)
 *A47J 36/16* (2006.01)

(52) U.S. Cl.
 CPC ........................... *A47J 36/165* (2013.01)
 USPC ....... 99/323.5; 99/323.6; 99/323.7; 99/323.8; 99/323.9; 99/348; 392/307; 392/341; 392/343; 392/350; 392/360; 126/343.5 A; 126/343.5 R; 126/25 R; 126/9 R

(58) Field of Classification Search
 CPC ...................................... A47J 36/165
 USPC ............ 99/323.5, 323.6, 323.7, 323.8, 323.9, 99/323.11, 348; 392/307, 341, 343, 344, 392/345–347, 350, 356, 360–362, 379, 407, 392/410, 416; 126/343.5 A, 343.5 R, 25 R, 126/9 R
 See application file for complete search history.

(56) References Cited

U.S. PATENT DOCUMENTS

| 522,586 | A | | 7/1894 | Cascaden, Jr. |
| 2,645,993 | A | * | 7/1953 | Voss ................................ 99/480 |
| 3,120,169 | A | | 2/1964 | Echols, Jr. |
| 4,467,783 | A | * | 8/1984 | Hurley et al. .............. 126/378.1 |
| 5,549,042 | A | * | 8/1996 | Bukoschek et al. ............ 99/455 |
| 5,857,403 | A | | 1/1999 | Mann |
| 6,220,148 | B1 | * | 4/2001 | Pearce et al. .................. 99/323.7 |
| 6,234,064 | B1 | * | 5/2001 | Turrel ........................... 99/323.9 |

* cited by examiner

*Primary Examiner* — Dana Ross
*Assistant Examiner* — Ket D Dang
(74) *Attorney, Agent, or Firm* — Thomas Schneck

(57) ABSTRACT

A blower intensified gas flame kettle including a kettle disposed in an upper housing and a gas burner disposed in a lower housing and having gas burner jets at least partially inserted into the upper housing. Burning gases emanating from the gas burner jets are directed toward the kettle and contained by the upper housing. The temperature and velocity of the burning gases are enhanced by action of a blower which blows air which mixes with flammable gas in the gas burner prior to burning. Higher temperatures and improved, radiant, conductive and convection heating of the kettle are achieved. A mechanized stirrer enhances heating of contents of the kettle by stirring the contents of the kettle.

12 Claims, 2 Drawing Sheets

BLOWER INTENSIFIED GAS FLAME KETTLE

TECHNICAL FIELD

The present invention relates generally to gas flame kettles and more specifically to heating of a kettle with a blower intensified gas flame.

BACKGROUND

Popcorn of the type commonly known as "kettle corn" is popped in a large metal kettle which is heated by an open flame. Tiresome stirring of the popping popcorn is required to provide even heat distribution to the popcorn and prevent burning. This method of popping popcorn dates back to colonial times and is considered to produce popcorn with enhanced flavor and texture. Kettle corn is made and sold primarily at outdoor locations such as fairs, festivals, and flea markets where the open flame is created by burners using liquid propane for fuel which are able to quickly flash heat the kettle to temperatures sufficient to pop the popcorn. The liquid propane is stored under pressure in tanks. Liquid propane, being under pressure, supplies sufficient fuel to the burner which enables the burner to heat the kettle to temperatures required to pop the popcorn.

Making kettle corn at indoor locations, such as malls, presents particular problems. There are regulations for both building and fire codes that prohibit use of pressurized propane tanks at indoor locations. Use of natural gas, piped in through gas lines, is required. The natural gas is maintained at relatively low pressure as a safety precaution. This low pressure helps minimize the amount of natural gas that may escape through leaks in the gas lines and any devices or equipment that use the low pressure natural gas. Additives are used with odorless natural gas to give it a "rotten-egg" odor so that leaks may be more easily detected. This relatively low pressure, under which the natural gas is held, causes an insufficient supply of natural gas delivered to the burner to create high enough temperatures to flash heat the kettle to pop the popcorn.

SUMMARY

The present invention has solutions to help overcome the described problems which may be advantageously applied to popping popcorn. The present invention not only helps to enhance heat transfer from a gas burner to a kettle but also helps to enhance heat transfer from the kettle to contents of the kettle. Heat transfer from the gas burner to the kettle is enhanced by, among other things, intensifying the gas flame with a blower and heat transfer from the kettle to the contents of the kettle is enhanced using a mechanized stirrer.

The burner jets of the gas burner are at least partially extended into a first housing, which defines a combustion compartment, into which the kettle is also at least partially inserted. The burner is attached to a second housing. The temperature of the gas flame and its associated burning gases is intensified by a blower that blows air to the gas burner which burns relatively low pressure natural gas received from a gas pipeline. The blown air increases the temperature of the burning gases and also increases the velocity of the hot gases directed to the bottom of the kettle by the gas burner jets.

The combustion compartment is enclosed except for an appropriately sized vent for the exhaust of built up hot gases. The kettle is heated by radiant, conductive, and convection heating by the high temperature and high velocity burning gases. The enhanced temperature of the burning gases yields better radiant and conductive heating of the kettle. Being enclosed, the combustion compartment helps improve convection heating the kettle. The high velocity high hot gases make constant and direct contact with the outer surface of the kettle ensuring more rapid heating of the kettle. Enclosing the combustion compartment also provides an insulating effect with helps to trap heat and contain the high velocity burning gases. In some embodiments, the first housing may be of multi-walled construction thereby providing improved insulating properties. Other embodiments may have insulating material incorporated into the multi-walled construction.

Heat conduction from the kettle to contents of the kettle is enhanced with a mechanized stirrer. The arms of the mechanized stirrer are parallel to and in proximity with the inner surface of the kettle. The distance from the arms to the kettle is correlated with the size of the contents. Heat conduction is improved by the stirring action of the mechanized stirrer since the contents are stirred to contact a larger area of the kettle 110 thus being heated quickly and uniformly.

DETAILED DESCRIPTION

Figure 1:
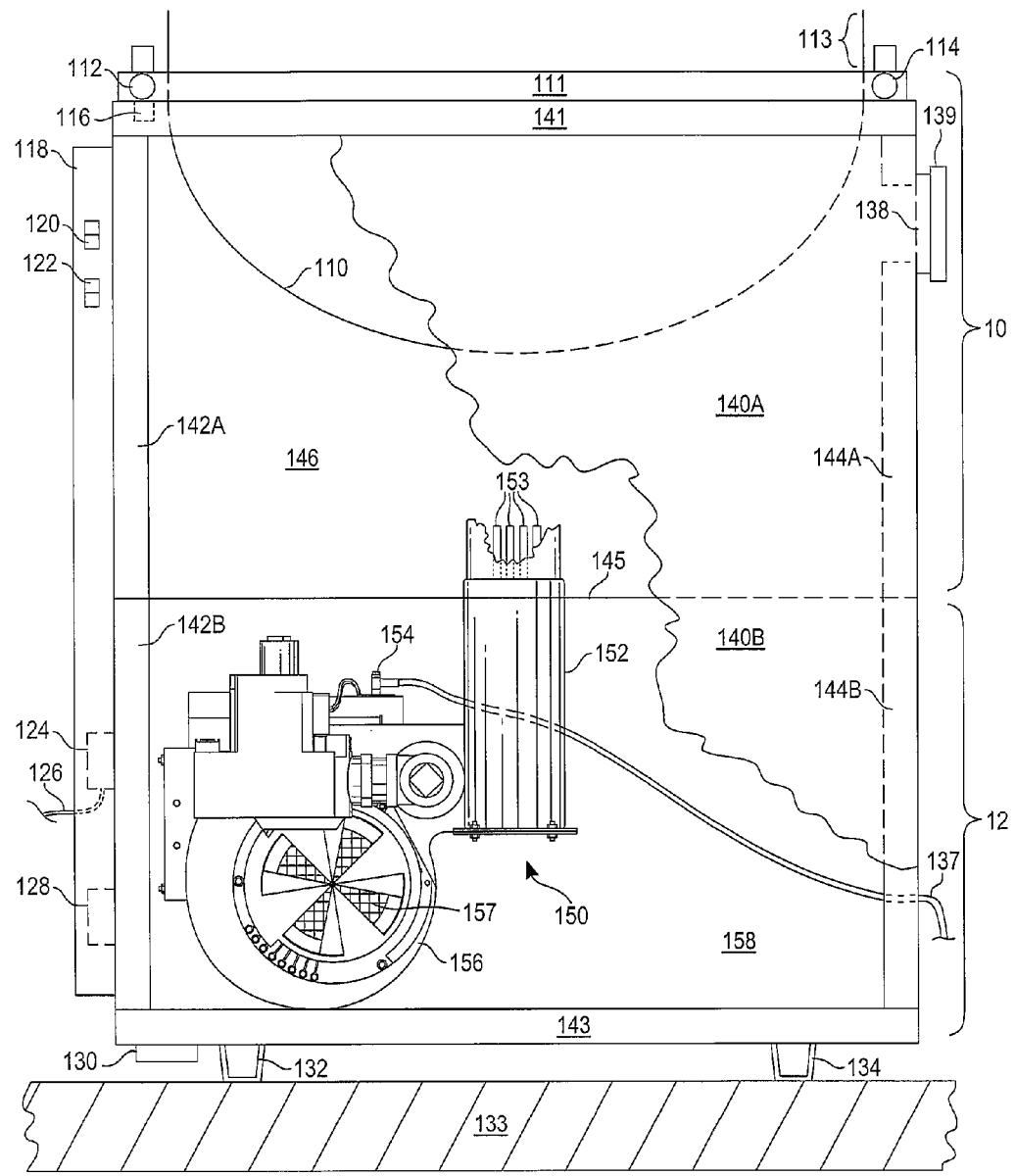
FIG. 1 is a side view of an embodiment of a blower intensified gas flame kettle with a portion of a side broken away.

With reference to FIG. 1, an embodiment of a blower intensified gas flame kettle with first housing 10 and second housing 12 is shown. First housing 10 forms combustion compartment 146 and second housing 12 forms burner compartment 158. First housing 10 and second housing 12 are constructed of materials able to withstand temperatures generated by a burner apparatus 150, and provide support for the various components described below. Such a material includes, although is not limited to, sheet metal.

First housing 10 has first housing vertical side walls 140A, 142A, 144A, and a fourth first housing vertical side wall (not shown) at the rear of first housing 10 opposite vertical side wall 140A. Vertical side walls 142A and 144A are opposite each other. In this specific embodiment, the four first housing vertical side walls are flat planar surfaces. Each first housing vertical side wall is connected to adjacent side walls along their vertical edges forming an enclosed walled area of first housing 10. The first housing vertical side walls may be fixedly connected or detachably connected. Other embodiments may have curved or angular first housing vertical side walls enabling two or three first housing vertical sidewalls to form the enclosed walled area of first housing 10. Still other embodiments may have more than four first housing vertical side walls in various combinations of planar, curved, and angular first housing vertical side walls forming the enclosed walled area of first housing 10. In addition, first housing vertical side walls may be of single or multi-layer construction with each layer spaced apart from any flanking layers. This spacing helps increase the insulating properties of the first housing vertical side walls thus aiding to reduce heat loss from the first housing 10 when burner apparatus 150 is in operation. The space between the layers may be filled with an insulting material to further reduce heat loss.

First housing 10 also has a vent 138 and a diverter 139 positioned on vertical side wall 144A. The vent 138 enables a buildup of hot gasses to escape from first housing 10 and the diverter 139 directs the flow of the escaping hot gasses. Vents and diverters are well known in the art ranging from vents of perforated sheet metal and diverters of a solid piece of sheet metal, as shown in FIG. 1, to complex chimneys and flues, and need not be discussed further. Vent 138 and diverter 139 may be positioned at any appropriate portion of first housing 10.

The bottoms of the first housing vertical side walls are connected to the perimeter of first housing bottom member 145. First housing bottom member 145 is transverse to the first housing vertical side walls and is shaped to match the enclosed walled area of first housing 10. First housing bottom member 145 may be of single or multi-wall construction as described above. In addition, the first housing vertical side walls may be fixedly or detachably connected to first housing bottom member 145.

The tops of the first housing vertical side walls are connected to the perimeter of top member 141. First housing bottom member 145 is positioned transverse to the first housing vertical side walls and is shaped to match the enclosed walled area of first housing 10. Top member 141 may be of single or multi-wall construction as described above. In addition, the first housing vertical side walls may be fixedly or detachably connected to top member 141. In this specific embodiment, top member 141 has an opening in it enabling placement and removal of the kettle 110 into and out of the opening of the top member 141. When the kettle 110 is placed into the opening of top member 141 the bottom of kettle 110 is in proximity to burner jets 153. Top member 141 also has safety switch 116 bordering vertical side wall 140A. Safety switch 116, when released to its default position, extended above the surface of top member 141, causes burner apparatus 150 to be shut off. When safety switch 116 is depressed into top member 141 operation of burner apparatus 150 is enabled.

Also shown is kettle retaining member 111 which is attached by at least one hinge (not shown) to a first housing vertical side wall, which in this specific embodiment is the fourth first housing vertical side wall (not shown) at the rear of first housing 10. Kettle retaining member 111 may be attached by the at least one hinge to top member 141 which in this specific embodiment is at the rear of top member 141 adjacent to the fourth first housing vertical side wall. Kettle retaining member 111 may be of single or multi-wall construction as described above. Kettle 110 is fixedly attached to kettle retaining member 111 so that the inner volume and inner surface of kettle 110 is open and easily accessible. Part of kettle 110 is kettle extension 113 which is a portion of kettle 110 protruding past kettle retaining member 111 and outside of combustion compartment 146. Kettle extension 113 is basically a portion of kettle 110 resembling a circular collar or flange extending the upper edge of kettle 110 above kettle retaining member 111. Kettle 110 is constructed of a metal with good heat conduction properties and of a thickness that can withstand heat and high temperatures produced by burner apparatus 150. Metals used to construct kettle 110 include, but are not limited to, iron, copper, and food grade stainless steel.

Kettle retaining member 111 has handles 112, 114 located near vertical side wall 140A, opposite the at least one hinge. In this embodiment, handles 112, 114 are cylindrically shaped and extend outwardly from and in the same plane as kettle retaining member 111. Lifting and lowering of handles 112, 114 enables rotation of kettle retaining member 111 about the axis of rotation of the at least one hinge thereby raising and lowering the kettle 110 from and into top member 141 and actuating safety switch 116.

When the kettle 110 is lowered into the opening of top member 141, first housing 10 becomes enclosed and safety switch 116 is depressed enabling operation of burner apparatus 150. When the kettle 110 is raised from the opening of top member 141, first housing 10 becomes open and the safety switch 116 is released to its default position disabling operation of burner apparatus 150. This reduces the possibility of an operator being burned when the kettle 110 is lifted and exposed to the opened first housing 10 since the burner apparatus 150 is shut off and stops burning when the safety switch 116 is released to its default position.

In a specific alternate embodiment, top member 141 may not be present. Top member 141 is replaced by kettle retaining member 111. In this specific embodiment, kettle retaining member 111 is attached by the at least one hinge (not shown) to a first housing vertical side wall as described above. Kettle retaining member also has kettle 110, kettle extension 113, and handles 112, 114 as described above. Kettle retaining member 111 may be raised and lowered by handles 112, 114 as described above thereby enclosing and opening the first housing 10 and actuating safety switch 116 as described above. In this specific alternate embodiment, safety switch 116 may be positioned at the top of vertical sidewall 140A or at the top of vertical sidewalls 142A 144A adjacent to vertical sidewall 140A thus enabling actuation of safety switch 116 as described above.

Side housing 118 is shown attached to both first housing 10 and second housing 12. In alternate embodiments, side housing 118 may be attached to either first housing 10 or second housing 12. Side housing 118 is openable enabling access to the inside of side housing 118. Electrical distribution system 124 is positioned inside side housing 118 and has electrical wire 126 which may be connected to a source of electricity thereby providing electrical power to electrical distribution system 124. Electrical distribution system 124 enables distribution of electrical power to the various components and elements described in this document. Timer shutoff 128 is positioned inside side housing 118 and receives power from electrical distribution system 124. Timer shutoff 128 imposes an adjustable upper limit for the amount of time during which the burner apparatus 150 may be in continuous operation. Burner apparatus 150 is shut off by the timer shutoff 128 when the upper limit for continuous operation is exceeded.

Side housing 118 has master switch 120 and burner switch 122 positioned, in an accessible location, on the outside surface of side housing 118. Master switch 120 and burner switch 122 receive electrical power from electrical distribution system 124. Master switch 120, which in this embodiment is an on/off switch, allows and disallows distribution of electrical power to all components. When master switch 120 is in the off position, electrical power is not distributed and components requiring electrical power are prevented from operating. When master switch 120 is in the on position, electrical power is distributed and electrical power may be received by components. Burner switch 122, which in this embodiment is an on/off switch, allows and disallows distribution of electrical power to burner apparatus 150. When master switch 120 is in the off position, no electrical power is being distributed and burner switch 122 has no effect on the operation of burner apparatus 150 which would not be in operation due to the absence of electrical power. When master switch 120 is in the on position, burner switch 122 may control the distribution of electrical power to burner apparatus 150 thereby turning burner apparatus on and off.

Second housing 12 has second housing vertical side walls 140B, 142B, 144B, and a fourth second housing vertical side wall (not shown) at the rear of second housing 12 opposite vertical side wall 140B. In this embodiment, positioning of the second housing vertical side walls mirror the positioning of the first housing vertical side walls creating the same shape for first housing 10 and second housing 12. Vertical side walls 142B and 144B are opposite each other. In this specific embodiment, the four second housing vertical side walls are flat planar surfaces. Each second housing vertical side wall is connected to adjacent side walls along their vertical edges forming an enclosed walled area of second housing 12. The second housing vertical side walls may be fixedly connected or detachably connected. Other embodiments may have curved or angular second housing vertical side walls enabling two or three second housing vertical sidewalls to form the enclosed walled area of second housing 12. Still other embodiments may have more than four second housing vertical side walls in various combinations of planar, curved, and angular second housing vertical side walls forming the enclosed walled area of second housing 12. In addition, second housing vertical side walls may be of single or multi-layer construction as described above. In alternate embodiments, positioning of the vertical side walls of first housing 10 may differ from the position of the vertical side walls of second housing 12 yielding dissimilar shapes for first housing 10 and second housing 12.

The bottoms of the second housing vertical side walls are connected to the perimeter of second housing bottom member 143. Second housing bottom member 143 is positioned transverse to the second housing vertical side walls and shaped to match the enclosed walled area of second housing 12. Second housing bottom member 143 may be of single or multi-wall construction as described above. In addition, the second housing vertical side walls may be fixedly or detachably connected to second housing bottom member 143. The second housing vertical side walls and the second housing bottom member 143 may be at least partially open thus enabling air flow to burner apparatus 150.

Second housing bottom member 143 has feet 132, 134 and electrical outlet 130. Feet 132, 134 support second housing bottom member 143 from floor 133. Feet 132, 134 may extend longitudinally across second housing bottom member 143. In alternate embodiments, feet 132, 134 may be not extend across second housing bottom member 143 and at least one additional foot is used to support second housing bottom member 143 from floor 133. Feet 132, 134 in this specific embodiment, impede movement relative to the floor 133. In alternate embodiments, feet 132, 134 may facilitate movement relative to the floor 133. Movement may be facilitated, for example, by use of wheels which may be lockable to reduce or impede movement when so desired. Electrical outlet 130 receives electrical power from electrical distribution system 124 and may be used to supply power to components not directly connected to electrical distribution system 124.

In alternate embodiments, a movement limiting device may be attached to either first housing 10 or second housing 12, and to a stationary object which may be a wall or the floor 133. The movement limiting device may include but is not limited to, a chain, a cable, and a steel bar.

The tops of the second housing vertical side walls are connected to the perimeter of first housing bottom member 145. First housing bottom member 145 is positioned transverse to the second housing vertical side walls and shaped to match the enclosed walled areas of first housing 10 and second housing 12. First housing bottom member 145 may be of single or multi-wall construction as described above. In addition, the tops of second housing vertical side walls may be fixedly or detachably connected to first housing bottom member 145. Since in this specific embodiment, positioning of the second housing vertical side walls mirror the positioning of the first housing vertical side walls, second housing vertical side walls are connected to first housing bottom member 145 at the same location as the first housing vertical side walls. Therefore, first housing vertical side walls are positioned directly on top of and supported by second housing vertical side walls. Correspondingly, first housing 10 is positioned directly on top of second housing 12. Alternate embodiments may not have this mirroring and first housing vertical side walls and second housing vertical side walls may be attached to first housing bottom member 145 at different locations and are neither mirrored nor directly on top of one another.

Burner apparatus 150 is attached to and is positioned inside of second housing 12 and is electrically connected to electrical distribution system 124. Operation of burner apparatus 150 and its components may be controlled by safety switch 116, master switch 120, burner switch 122, and timer shutoff 128 as described above. Burner apparatus 150 is a gas burning apparatus which includes gas burner 152 operatively connected to blower 156 and a gas inlet 154. Gas burner 152 has gas burner jets 153. Gas burner 152 extends partially through first housing bottom member 145 thereby protruding gas burner jets 153 into combustion compartment 146 so that gas burner jets 153 are positioned for heat transfer engagement with the kettle 110. Gas inlet 154 is connected to gas line 137 which is connected to a source of flammable gas such as a natural gas pipeline (not shown) for enablement of the flow of flammable gas to gas burner 152 and gas burner jets 153. Gas line 137 may have at least one gas flow control device for controlling the flow of flammable gas to gas inlet 154. The at least one gas flow control device may include, but is not limited to, a valve, a gas flow regulator, and a pressure gauge. Blower 156 has at least one air inlet 157 enabling blower 156 to blow air to gas burner 152 where the air is mixable with the flammable gas entering from gas inlet 154 thereby intensifying the temperature and velocity of flames of burning gas emanating from the gas burner jets 153. The intensified temperature and velocity of the burning gas not only produces enhanced radiant heating of the kettle 110 but also enhanced convection heating of the entire surface of kettle 110 extending into combustion compartment 146. The intensified velocity of the gasses inside the enclosed combustion compartment 146 enables the hot gasses to be in constant contact with the kettle 110 providing intensified heat transfer to the kettle 110.

In an alternate embodiment, only one set of vertical side walls may be used which extends from the top of first housing 10, top member 141, to the bottom of second housing 12, second housing bottom member 143. In this alternate embodiment, first housing bottom member 145 is connected to the one set of vertical side walls thereby creating combustion compartment 146 of first housing 10 and burner compartment 158 of second housing 12.

Figure 2:
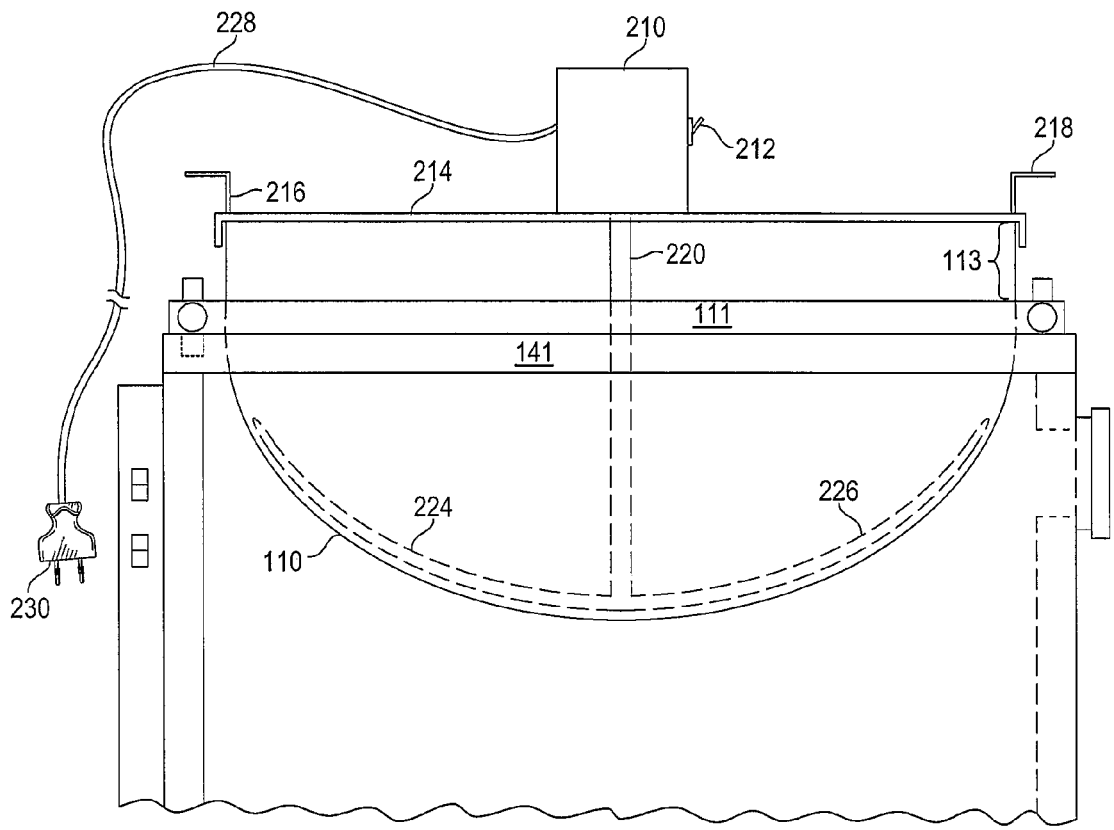
FIG. 2 is a side view of an embodiment of a stirring apparatus for the gas flame kettle of FIG. 1.

With reference to FIG. 2, an embodiment of a stirring apparatus, for stirring contents of kettle 110 is shown. Motor 210, having a rotor (not shown), is fixedly mounted on a surface of motor support 214 opposite the inner volume and inner surface of kettle 110 so that the rotor is at the midpoint of motor support 214. In alternate embodiments, motor 210 may be detachably mounted to motor support 214. Motor support 214 is a rectangular member extending diagonally across kettle 110 and approximately the width of motor 210 thus ensuring that the midpoint of motor support 214 and the rotor are centered relative to kettle 110. Motor 210 and motor support 214 are dimensioned so that the inner volume and inner surface of kettle 110 remain open and easily accessible. Motor support 214 is of a strength and stiffness able to support motor 210, stirrer shaft 220, first stirrer arm 224, and second stirrer arm 226 while in operation. Motor support 214, stirrer shaft 220, first stirrer arm 224, and second stirrer arm 226 are preferably made of a food grade material including, but not limited to food grade stainless steel. Motor support 214 has motor support clamps 216, 218 which detachably connect motor support 214 to kettle extension 113.

Motor 210 has an electrical on/off switch 212, and an electrical cord 228 terminating at electrical plug 230. Electrical on/off switch 212 controls the flow of electricity to motor 210 thereby enabling motor 210 to be turned on and off. Electrical plug 230 may be detachable plugged into an electrical outlet such as the electrical outlet 130 of FIG. 1. When electrical plug 230 is detachably plugged into electrical outlet 130, flow of electricity to motor 210 may also be controlled by safety switch 116, master switch 120, burner switch 122, and timer shutoff 128 as described above for burner apparatus 150. In alternate embodiments electric cord 228 may be wired to a source of electric power such as electrical distribution system 124. Use of the electrical plug 230, since it may be detachable plugged in an electrical outlet, facilitates removal of the stirring apparatus from the kettle 110.

The rotor is operatively connected to stirrer shaft 220 such that stirrer shaft 220 extends radially and centrally into kettle 110 toward the inner surface of kettle 110. Stirrer shaft 220 has first stirrer arm 224 and second stirrer arm 226 which extend from stirrer shaft 220 at least partially towards kettle extension 113. First stirrer arm 224 and second stirrer arm 226 are parallel to and in proximity to the inner surface of kettle 110. The distance of stirrer shaft 220, first stirrer arm 224, and second stirrer arm 226 to the inner surface of kettle 110 is correlated with the size of the contents of the kettle 110. This helps to enhance heat transfer to the contents by ensuring that the contents are stirred. This stirring enables the contents to contact a larger area of the kettle 110, be heated quickly and uniformly, and to minimize burning. Small sized contents would require a smaller distance to the inner surface of kettle 110 than large sized contents.

First stirrer arm 224 and second stirrer arm 226 may have various shapes, including but not limited to, solid round bar, solid flattened paddle, and perforated flattened paddle with holes of various sizes. Although two opposed stirrer arms are preferred, alternate embodiments may have only one stirrer arm or may have more than two stirrer arms.

What is claimed is:

1. An apparatus for heating a kettle, the apparatus comprising:
   a first metal housing having vertical side walls, a bottom wall positioned at the bottom of the vertical side walls, transverse to the vertical side walls, extending to and attached to the vertical side walls, a top member positioned at the top of the vertical side walls, hingedly attached to one of the vertical side walls, and having the kettle associated with the top member closing the first metal housing in a manner wherein the first metal housing forms a combustion compartment into which the kettle is at least partially inserted; and
   a second metal housing below the first metal housing, forming a burner compartment below the combustion compartment and sharing the bottom wall of the first metal housing, with a gas burner extending from the second metal housing through the bottom wall of the first metal housing below the kettle, and a blower in the second metal housing communicating air to flammable gas in the gas burner so that the flammable gas contacts the kettle with the kettle heated by radiant conductive and convection heating within the combustion compartment.

2. The apparatus of claim 1 wherein the kettle is fixedly attached to a kettle retaining member which is hingedly attached to the top member enabling placement and removal of the kettle into and out of an opening in the top member thereby closing the first metal housing when the kettle is placed in the opening of the top member.

3. The apparatus of claim 1 wherein the vertical side walls are detachably connected.

4. The apparatus of claim 1 wherein the second metal housing is at least partially opened enabling airflow to the blower.

5. The apparatus of claim 1 further comprising a vent positioned within the first metal housing enabling exhaust of gasses from the first metal housing.

6. The apparatus of claim 1 further comprising an electrical distribution system operatively connected to a source of electric power for distributing electrical power to the apparatus.

7. The apparatus of claim 1 further comprising a gas line operatively connected to a source of flammable gas for conveying the flammable gas to the gas burner.

8. The apparatus of claim 7 further comprising at least one gas flow control device, wherein the at least one gas flow device includes at least one of a valve, a gas flow regulator, and a pressure gauge enabling control of the flow of the flammable gas in the gas line to the gas burner.

9. The apparatus of claim 1 further comprising a stirring apparatus wherein the stirring apparatus has a motor having a rotor, the motor attached to a motor support, the motor support detachably connected to the kettle, the rotor operatively connected to a stirrer shaft extending radially into the kettle, the stirrer shaft connected to at least one stirrer arm which is positioned parallel to and in proximity of the inner surface of the kettle.

10. The apparatus of claim 9 wherein the motor is an electric motor.

11. The apparatus of claim 9 wherein the stirrer shaft and the at least one stirrer arm are of food grade metal.

12. An apparatus for popping popcorn, the apparatus comprising:
   a kettle;
   a first metal housing having vertical side walls, a bottom wall positioned at the bottom of the vertical side walls, transverse to the vertical side walls, extending to and attached to the vertical side walls, a top member positioned at the top of the vertical side walls, hingedly attached to one of the vertical side walls, and having the kettle associated with the top member closing the first metal housing in a manner wherein the first metal housing forms a combustion compartment into which the kettle is at least partially inserted;
   a second metal housing below the first metal housing, forming a burner compartment below the combustion compartment and sharing the bottom wall of the first metal housing, with a gas burner extending from the second metal housing through the bottom wall of the first metal housing below the kettle, and a blower in the second metal housing communicating air to flammable gas in the gas burner so that the flammable gas contacts the kettle with the kettle heated by radiant, conductive and convection heating within the combustion compartment; and
   a stirring apparatus wherein the stirring apparatus has a motor having a rotor, the motor attached to a motor support, the motor support detachably connected to the kettle, the rotor operatively connected to a stirrer shaft extending radially and centrally into the kettle, the stirrer shaft connected to at least one stirrer arm which is positioned parallel to and in proximity of the inner surface of the kettle.

* * * * *